United States Patent [19]

Adam et al.

[11] Patent Number: 4,993,277
[45] Date of Patent: Feb. 19, 1991

[54] CONFIGURATION FOR LIMITING THE AXIAL PLAY OF THE SHAFT OF A MOTOR-DRIVE MECHANISM

[75] Inventors: Peter Adam, Hoechberg; Rolf Deynet, Wuerzburg; Ronald Gleixner, Ochsenfurt, all of Fed. Rep. of Germany

[73] Assignee: Siemens Aktiengesellschaft, Berlin & Munich, Fed. Rep. of Germany

[21] Appl. No.: 514,177

[22] Filed: Apr. 25, 1990

[30] Foreign Application Priority Data

Apr. 25, 1989 [EP] European Pat. Off. ........ 89107466.8

[51] Int. Cl.⁵ .............................................. F16H 1/16
[52] U.S. Cl. ......................................... 74/425; 74/409
[58] Field of Search ................ 74/425, 89.14, 409, 74/500

[56] References Cited

U.S. PATENT DOCUMENTS

| | | | |
|---|---|---|---|
| 3,511,920 | 5/1970 | Hertfelder | 74/425 X |
| 3,549,218 | 12/1970 | Cagnon et al. | 308/163 |
| 3,600,965 | 8/1971 | Folkerts | 74/409 X |
| 4,452,541 | 6/1984 | Carpenter | 384/223 |
| 4,652,781 | 3/1987 | Andrei-Alexandru et al. | 74/425 X |
| 4,742,726 | 5/1988 | Adam et al. | 74/425 |

FOREIGN PATENT DOCUMENTS

| | | |
|---|---|---|
| 0082375 | 7/1984 | European Pat. Off. . |
| 0133527 | 2/1985 | European Pat. Off. . |
| 2809390 | 9/1984 | Fed. Rep. of Germany . |
| 2532699 | 3/1984 | France . |
| 2016213 | 9/1979 | United Kingdom . |
| 2086145 | 5/1982 | United Kingdom . |

*Primary Examiner*—Philip C. Kannan
*Attorney, Agent, or Firm*—Kenyon & Kenyon

[57] ABSTRACT

An apparatus for limiting the axial play of the shaft of a motor drive mechanism wherein the precise setting of the axial play (<<0.05 mm) is possible in a simple manner using production and assembly technology. A deformable guard plate, which is secured on its marginal side by a setscrew, in particular a standard production screw, is axially pressed in a contact zone until the desired axial play is achieved. The setscrew is axially supported in front on the case side.

13 Claims, 2 Drawing Sheets

CONFIGURATION FOR LIMITING THE AXIAL PLAY OF THE SHAFT OF A MOTOR-DRIVE MECHANISM

BACKGROUND OF THE INVENTION

This invention relates to a configuration for limiting the axial play of the shaft of a motor drive mechanism.

A known configuration for limiting the axial play of the shaft of a motor drive mechanism is described in European Pat. No. B1-0 133 527. In this configuration, a stop lug is provided which has a defined lug length depending on a previous comparison between the actual and desired axial play of the shaft. This stop lug is molded into the guard plate before being inserted into a pocket which is attached to the housing of the motor drive mechanism.

Another method for adjusting the axial play of an engine gear shaft in a geared engine is shown in German Pat. No. 28 09 390. In this method, the armature shaft is permitted to extend with play at its end on the engine side into a bore hole of a setscrew having a mushroom guard head. The mushroom guard head is premolded axially to the face of the shaft. Also the armature shaft is affixed to the engine housing cover and is adjustable.

There is a need for a method for precisely setting the axial play of the shaft of a motor drive mechanism in a simple manner according to production and assembly technology by butting a face of the shaft against a guard plate.

SUMMARY OF THE INVENTION

These and other needs are satisfied by the present invention for a configuration for limiting the axial play of the shaft of a motor drive mechanism.

The configuration of the present invention permits a very precise setting of the axial play in setting devices which are already mounted in the housing of the motor drive mechanism that operate by screwing in a setscrew. In this invention a separate structural development of the setscrew (e.g. with a mushroom guard head on the face side), can be dispensed with by an interposed guard plate.

The setscrew can be made of plastic, and it is prevented from counterrotating out of its setting position by premolding a knurled ratchet with ratchet teeth on the screwed socket. The ratchet teeth can expand and oppose the counterrotation of the setscrew. When the setscrew begins to counterrotate, the ratchet teeth can dig into the concentric screwed socket. The case opening can be closed in a waterproof manner by premolding a sealing cap on the setscrew. This prevents counterrotation of the setscrew and/or sealing off of a case opening which receives the setscrew and opens axially to the outside. The sealing cap comprises a sealing shell which is concentric to the setscrew and can be pressed into the case opening, and a radially and axially elastic, bellows-type portion located between the sealing shell and the outer periphery of the setscrew.

DETAILED DESCRIPTION

Figure 1:
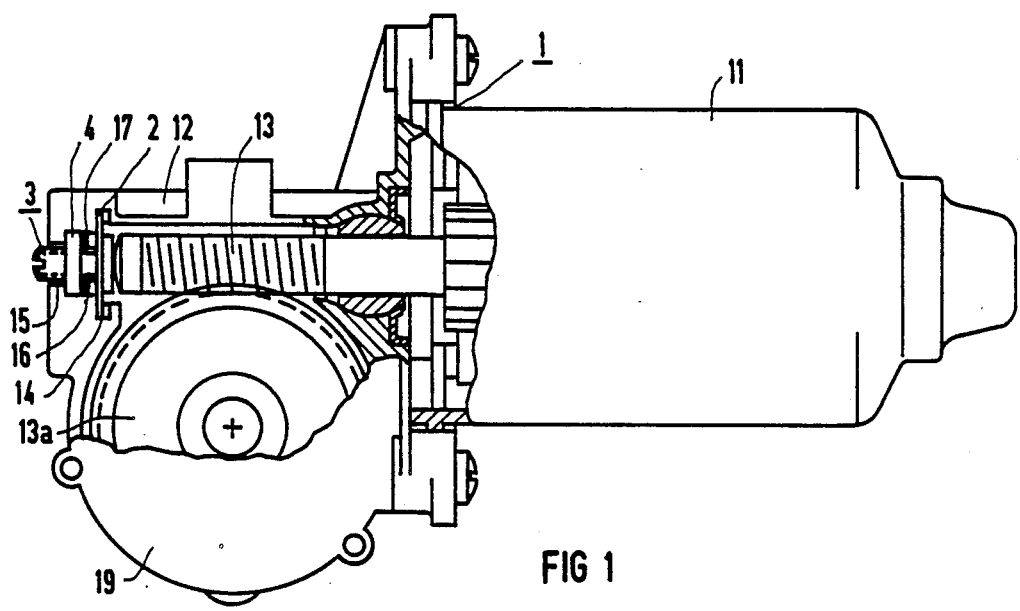
FIG. 1 is a longitudinal cross-section of a window-actuating motor drive for a motor vehicle with a setscrew which can be controlled from the outside, constructed according to the present invention.

A longitudinal cross-section of a motor drive mechanism is shown in FIG. 1. The motor drive mechanism includes a magnetoelectric commutator motor disposed within an electromotor housing 11 and a worm gear 13a which is disposed in a gear case 12. The gear case 12 is flange-mounted onto the electromotor housing 11. One end of a traversing shaft 13 is provided with worm gear teeth. The traversing shaft 13 extends into the flange-mounted gear case 12 and mates with a worm gear 13a. The electromotor housing 11 comprises a cup-shaped, deep-drawn sheet metal part. The gear case 12 is formed from a saucer-shaped casting. The gear parts can be radially inserted into gear case 12. A case cover 19 encloses the gear case 12.

A guard plate 2 is located on the inside of the motor between one face of a setscrew 3 and the face of one end of the shaft 13. The setscrew 3 and the guard plate 2 serve to set the axial play of the shaft 13. A threaded nut 4 is provided as a screw support for the setscrew 3 making a separate threading of the gear case 12 unnecessary. Both the guard plate 2 as well as the setscrew 3 and the threaded nut 4, are inserted into pockets 14 or 15 in the gear case 12 and are subsequently secured by the placement of the case cover 19 during final assembly. In developments of the present invention in FIGS. 2, 5, and 6, the setscrew 3 is inserted at one of the outer ends of the gear case 12 through a cylindrical case opening 18. The inserted end of the setscrew lies in a pocket 16 of the gear case 12. To secure the setscrew 3 in its setting after the axial play has been set, wedging tabs 17, which can be bent towards the setscrew 3, are provided on the gear case 12 at the other end of the setscrew 3.

Figure 7:
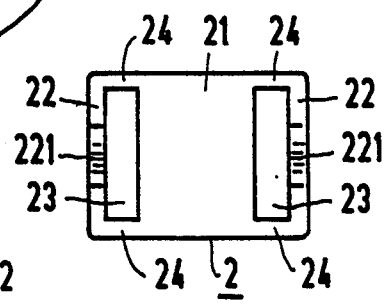
FIG. 7 is an axial plane view of a guard plate.
Figure 8:
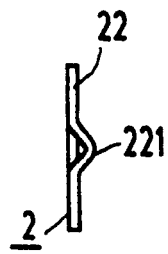
FIG. 8 is a side view of the guard plate of FIG. 7.

Referring to FIGS. 7 and 8, the guard plate 2 has marginal clamping regions 22 with molded clamping bosses 221 which can be elastically pressed in between the walls of the pocket 14 to position the guard plate 2 in its pocket 14 allowing a solid hold even during rough usage and long operating times.

Because the actual axial play differs from the desired axial play, the setscrew 3 is screwed into the gear case 12 with support in the screwed nut 4 during the installation on the guard plate 2. The setscrew 3 is screwed into the gear case until the desired axial play (preferably $<<0.05$ mm) is reached between the forward-pressed contact zone 21 and the opposite face of the shaft 13. A partial plastic deformation of the guard plate 2 by the setscrew 3 is allowed at least in the region of its contact zone 21. For this purpose, as shown in FIGS. 7 and 8, the contact zone 21 up to connecting portions 24, is laid open by sections 23 so that it can be deformed. The contact zone 21 opposes marginal clamping regions 22.

To employ one of the motor drive mechanisms of the present invention (e.g. as a window-actuating drive mechanism in a motor vehicle), the entire mechanism can be sealed against moisture. This seal is achieved in a simple manner by designing the motor housing 11 as a cup-shaped housing which is thereby closed on one side of the shaft. After completing the setting process for the axial play, the gear case 12 can be sealed at the case opening 18 of the gear case 12, which is provided for the outside control of the setscrew 3.

Figures 2, 3, 4:
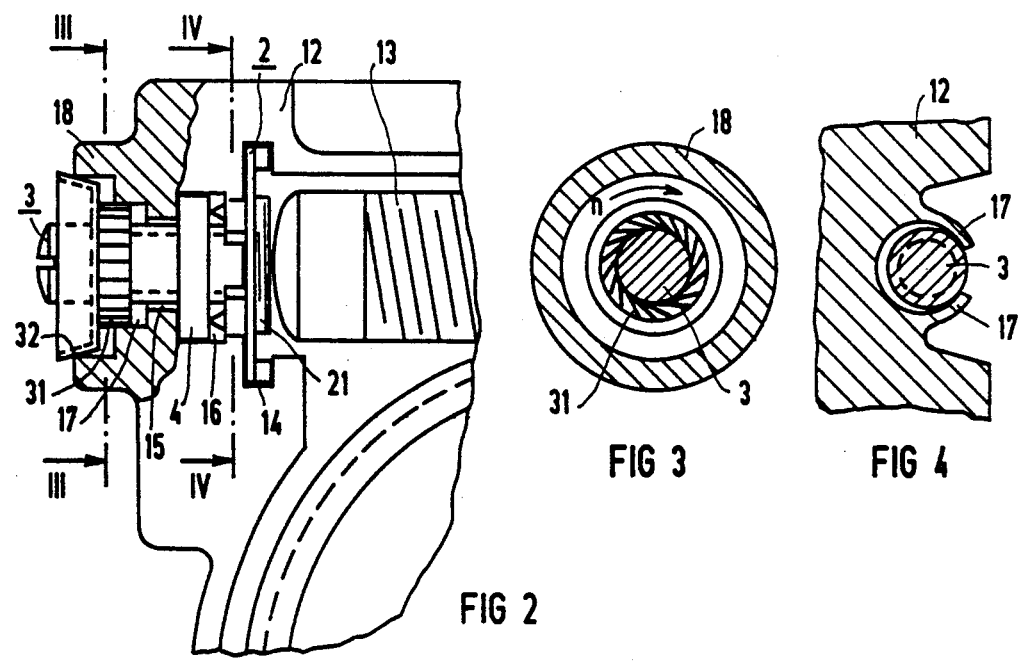
FIG. 2 is a longitudinal cross-section of one end of the shaft of FIG. 1, including a sealable case opening for the axial play setscrew.
FIG. 3 is a radial cross-section of path III—III of FIG. 2.
FIG. 4 is a radial cross-section of path IV—IV of FIG. 2.

Referring to FIG. 2, a sealing rim 32 is cast in one piece on the setscrew 3 and is preferably made of plastic. Due to its conical, outwardly expanding peripheral contour, the sealing rim 32 compresses into the case opening 18 of the gear case 12 when the setscrew 3 is screwed in. A knurled ratchet 31 (FIG. 3) is provided with ratchet teeth directed in opposition to the set rotational direction n. The ratchet teeth chock into the case contour of the case opening 18 which interlocks with the knurled ratchet 31 when the setscrew 3 begins to counterrotate. This knurled ratchet 31 and/or the wedging tabs 17 prevent the setscrew 3 from counterrotating after the setscrew 3 has reached the designated setting. The knurled ratchet 31 is also a one-piece component of the setscrew 3.

Figure 5:
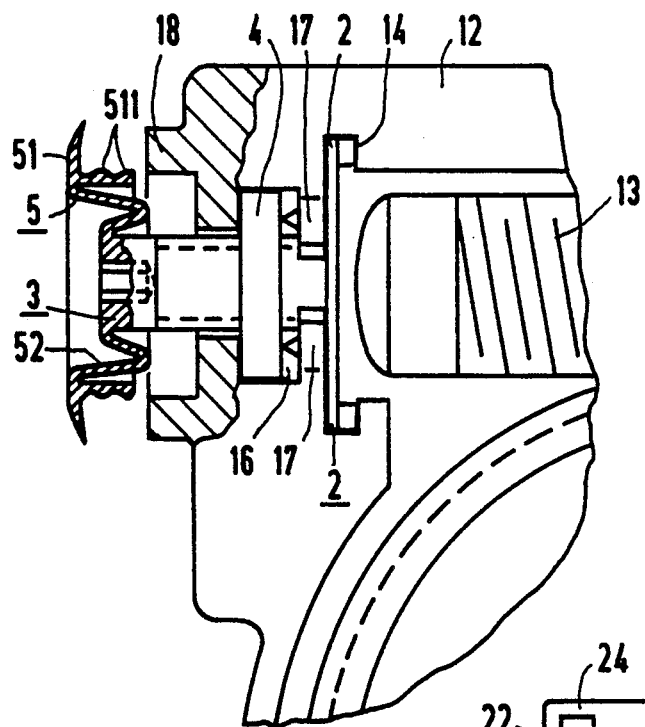
FIG. 5 is a longitudinal cross-section of a window-actuating motor drive where the sealing of the case opening occurs before the setscrew and seal have been positioned in their final assembly position.
Figure 6:
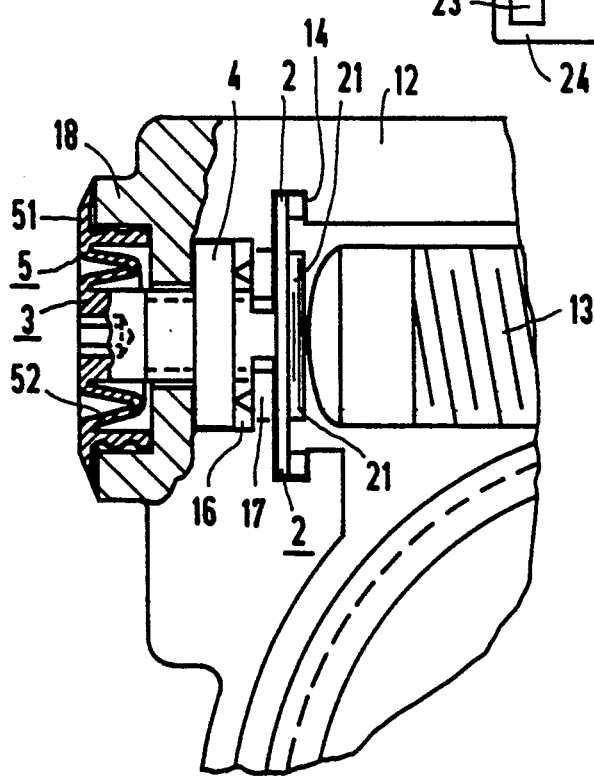
FIG. 6 is the configuration of FIG. 5 in a final assembly position.

Referring to FIGS. 5 and 6, an alternative method of sealing the case opening 18, setting the setscrew 3, and protecting against counterrotation of the setscrew is shown. For this purpose, a sealing cap 5 with a sealing shell 51, which is concentric to the setscrew 3, can be inserted into the case opening 18. A radially and axially elastic, closed bellows-type sealant 52 is provided between the sealing shell 51 and the outer periphery of the setscrew 3. The sealing shell 51, the sealant 52, and the setscrew 3 comprise a one-piece, plastic, injection-molded part.

Referring to FIG. 5, a longitudinal cross-section of a window-actuating motor drive is shown before the setscrew and sealing cap 5 have been positioned in their final assembly position. The sealing cap 5 is premolded onto the setscrew 3 at the beginning of the adjustment process. The guard plate 2 is not yet compressed opposite the face of the shaft 13 and the sealing cap 5 is held outside the case opening 18 without hindering the setting process of the setscrew 3.

Referring to FIG. 6, the configuration of FIG. 5 in a final assembly position is shown. The contact zone 21 is pushed out from the guard plate 2 by the opposing pressure of the setscrew 3 against the marginal regions of the guard plate 2 towards the end face of the shaft 13. The sealing shell 51 is pressed into the case opening 18 while the portion 52 is elastically shaped. To reinforce the sealing ability of the sealing shell 51, circular, elastic packing washers 511 are provided on its outer periphery.

We claim:

1. An apparatus for limiting the axial play of a motor drive shaft disposed in a housing of a motor drive mechanism, said apparatus comprising:

at least one guard plate, disposed in the housing of the motor drive mechanism, said guard plate being anchored on its marginal sides, placed axially in front of a first end of said shaft and having an axially movable contact zone;

a setscrew having one end inserted through said housing from the outside of the motor drive mechanism, said setscrew contacting said contact zone;

whereby movement of the setscrew sets the axial play of the shaft by axially pressing the contact zone to a defined clearance from the first shaft end depending upon a comparison between the actual axial play and the desired axial play of the shaft.

2. The apparatus of claim 1, wherein said setscrew causes a partial plastic deformation of the guard plate.

3. The apparatus of claim 2, wherein the marginal sides of the guard plate have clamping regions holding said guard plate within the housing of the motor drive mechanism, and said guard plate having intermediate connecting portions disposed between said clamping regions and said contact zone whereby the contact zone is freely deformable.

4. The apparatus of claim 1, wherein, at least in the region of the guard plate, said housing includes a cover radially separable, relative to the setscrew, from the remainder of the housing and said cover including pockets into which at least one of the guard plate and the setscrew can be inserted.

5. The apparatus of claim 4, further comprising a threaded nut radially inserted into one of said pockets for guiding the movement of the setscrew.

6. The apparatus of claim 5, and further including clamping closures securing at least one of the guard plate, the setscrew, and the threaded nut in their respective pockets.

7. The apparatus of claim 5, and further including wedging tabs securing at least one of the guard plate, the setscrew, and the threaded nut into at least one of their respective pockets.

8. The apparatus of claim 1, wherein the setscrew is made of plastic.

9. The apparatus of claim 8, and further including a knurled ratchet disposed in said housing, said housing having ratchet teeth preventing the setscrew from counterrotating by mechanically locking against said housing.

10. The apparatus of claim 8, and further including an opening in said housing through which said setscrew extends; and a sealing cap premolded onto the setscrew sealingly closing said opening.

11. The apparatus of claim 10, wherein the sealing cap comprises:

a sealing shell, which is concentric to the setscrew and inserted into the case opening to form a seal; and a radially and axially elastic, bellows-type portion disposed between the sealing shell and an outer periphery of the setscrew.

12. The apparatus of claim 11, wherein the sealing shell is provided with annular, elastic packing washers on its outer periphery.

13. The apparatus according to claim 1 wherein said setscrew is a standard production setscrew.

* * * * *